(12) United States Patent
Takayama et al.

(10) Patent No.: US 6,386,087 B2
(45) Date of Patent: May 14, 2002

(54) CONTROL BOOSTER

(75) Inventors: Toshio Takayama; Kunihiro Matsunaga; Takuya Obata, all of Yamanashi-ken (JP)

(73) Assignee: Tokico Ltd., Kawasaki (JP)

( * ) Notice: Subject to any disclaimer, the term of this patent is extended or adjusted under 35 U.S.C. 154(b) by 0 days.

(21) Appl. No.: 09/779,545

(22) Filed: Feb. 9, 2001

(30) Foreign Application Priority Data

Mar. 31, 2000 (JP) ........................................ 2000-099506

(51) Int. Cl.$^7$ .............................. F15B 13/16; F15B 7/00
(52) U.S. Cl. ........................... 91/367; 91/369.3; 60/545
(58) Field of Search ...................... 91/361, 367, 369.3, 91/369.4; 60/534, 545; 303/125, 113.4

(56) References Cited

U.S. PATENT DOCUMENTS

| | | | | |
|---|---|---|---|---|
| 5,207,770 A | * | 5/1993 | Fecher ....................... | 91/369.4 |
| 5,772,290 A | * | 6/1998 | Heibel et al. ............. | 60/545 X |
| 5,873,247 A | * | 2/1999 | Schluter et al. ............ | 60/534 |
| 5,937,727 A | * | 8/1999 | Klesen et al. ............. | 91/367 |
| 6,053,090 A | * | 4/2000 | Drott et al. .................. | 91/367 |
| 6,070,514 A | * | 6/2000 | Bayens et al. ............... | 91/367 |
| 6,155,156 A | * | 12/2000 | Takasaki et al. .............. | 91/367 |

* cited by examiner

Primary Examiner—John Ryznic
(74) Attorney, Agent, or Firm—Wenderoth, Lind & Ponack, L.L.P.

(57) ABSTRACT

The present invention provides a control booster which is capable of appropriately detecting a pedal-operated brake operation during an automatic brake operation. For moving a stop key from a position on a side of a rear-side abutment surface (where a reaction force of a switch acting on a switch operating rod and a spring force of a switch spring are balanced) toward an intermediate position, when the stop key is located on a side of the rear-side abutment surface, only a return force of the spring acts on a contact operating element of the switch. On the other hand, when the stop key moves toward the intermediate position, an abutment portion is separated from the contact operating element (that is, the switch operating rod moves in a direction for separation relative to the switch), so that no load is applied to the contact operating element. Breakage of the switch can be avoided when the brake pedal is operated during the automatic brake operation and operation of the brake pedal can be detected from the turning-off of the switch.

17 Claims, 10 Drawing Sheets

CONTROL BOOSTER

BACKGROUND OF THE INVENTION

The present invention relates to a control type booster having an automatic brake function, which electromagnetically operates an atmospheric air valve or a vacuum valve.

As an example of a control booster of the above-mentioned type, there can be mentioned a control booster comprising: a power piston dividing the inside of a housing into a constant pressure chamber and a variable pressure chamber; a valve mechanism adapted to control the supply of a working fluid to the variable pressure chamber, in accordance with movement of a plunger connected to an input rod associated with a brake pedal, the valve mechanism being provided in a valve body supported by the power piston; an electromagnetic bias means having a movable element which operates the valve mechanism independently of operation of the input rod; an electromagnetic solenoid connected to a power source and adapted to receive electric power and move the plunger; and a switch connected to the power piston and provided in the constant pressure chamber. The control booster further comprises a switch rod axially movable together with the input rod. The switch rod operates the switch when the input rod moves a predetermined distance relative to the power piston.

In this control booster, a braking force is generated by utilizing a differential pressure between the variable pressure chamber and the constant pressure chamber, which is generated by operation of the brake pedal (braking effected in this manner is hereinafter referred to as "the pedal-operated brake operation" for convenience's sake). Further, the control booster is capable of generating a braking force by generating a differential pressure between the variable pressure chamber and the constant pressure chamber due to operation of the electromagnetic bias means, independently of operation of the brake pedal (and hence the input rod) (braking effected in this manner is hereinafter referred to as "the automatic brake operation" for convenience's sake).

In the above-mentioned control booster of the related art, since the switch rod is connected to or engaged with the plunger, the amount of movement of the plunger is directly transmitted to the switch (a stationary contact of the switch) and the switch is operated by undesirably large force, leading to breakage of the switch.

Further, in the control booster, for effecting the pedal-operated brake operation during the automatic brake operation, it is desired to discontinue the automatic brake operation. To this end, it is considered to utilize the switch of the above-mentioned related art for detecting the pedal-operated brake operation during the automatic brake operation. However, in the switch of the above-mentioned related art, as mentioned above, the amount of relative movement of the plunger is directly transmitted to the switch, so that breakage of the switch is likely to occur. In fact, it is difficult to utilize the switch of the above-mentioned related art so as to discontinue the automatic brake operation for effecting the pedal-operated brake operation in an appropriate manner.

Further, as another example of the related art, there is a control booster described in Japanese National Publication (Kohyo) No. 10-505041 of PCT Application. In this control booster, the switch is provided in the variable pressure chamber. Therefore, the control booster encounters a problem that the switch is subject to atmospheric pressure each time the brake pedal is operated, so that the pressure applied to the switch frequently changes.

SUMMARY OF THE INVENTION

In view of the above situation, the present invention has been made. It is an object of the present invention to provide a control booster capable of appropriately detecting the pedal-operated brake operation during the automatic brake operation.

It is another object of the present invention to reduce a change in pressure acting on the switch.

The present invention provides a control booster comprising:

a power piston dividing an inside of a housing into a constant pressure chamber and a variable pressure chamber;

a valve mechanism which controls supply of a working fluid to the variable pressure chamber in accordance with movement of a plunger connected to an input rod associated with a brake pedal, the valve mechanism being provided in a valve body supported by the power piston;

an electromagnetic bias means having a movable element which operates the valve mechanism independently of operation of the input rod, the control booster being adapted to generate a thrust in the power piston due to a differential pressure generated between the variable pressure chamber and the constant pressure chamber based on operation of the valve mechanism;

a switch for detecting relative movement of the input rod relative to the valve body;

a switch operating rod for operating the switch; and a switch spring for biasing the switch operating rod in a direction for pushing-in a contact operating element of the switch, wherein when the input rod is operated in a direction for increasing an output of the booster in a state where a reaction force of the switch acting on the switch operating rod and a spring force of the switch spring are balanced, the switch operating rod moves in a direction for separation relative to the switch.

The present invention also provides a control booster comprising:

a power piston dividing an inside of a housing into a constant pressure chamber and a variable pressure chamber;

a valve mechanism which controls supply of a working fluid to the variable pressure chamber in accordance with movement of a plunger connected to an input rod associated with a brake pedal, the valve mechanism being provided in a valve body supported by the power piston;

an electromagnetic bias means having a movable element which operates the valve mechanism independently of operation of the input rod, the control booster being adapted to generate a thrust in the power piston due to a differential pressure generated between the variable pressure chamber and the constant pressure chamber based on operation of the valve mechanism;

a switch for detecting relative movement of the input rod relative to the valve body;

a switch operating rod for operating the switch; and a switch spring for biasing the switch operating rod in a direction for pushing-in a contact operating element of the switch, wherein in a brake pedal non-operated state in an automatic brake mode, the switch operating rod is pressed by the valve body through a pivot lever pivotably supported on the plunger and is separated from the switch and wherein when the input rod is operated in a direction for increasing an output of the booster in the brake pedal non-operated state in the automatic brake mode, the switch operating rod is freed from a pressure of the valve body applied through the pivot lever and abuts against the switch.

The present invention further provides a control booster comprising:

a power piston dividing an inside of a housing into a constant pressure chamber and a variable pressure chamber;

a valve mechanism which controls supply of a working fluid to the variable pressure chamber in accordance with movement of a plunger connected to an input rod associated with a brake pedal, the valve mechanism being provided in a valve body supported by the power piston;

an electromagnetic bias means having a movable element which operates the valve mechanism independently of operation of the input rod, the control booster being adapted to generate a thrust in the power piston due to a differential pressure generated between the variable pressure chamber and the constant pressure chamber based on operation of the valve mechanism;

a switch for detecting relative movement of the input rod relative to the valve body;

a switch operating rod for operating the switch;

a switch spring for biasing the switch operating rod in a direction for pushing-in a contact operating element of the switch; and an operating member for pressing the switch operating rod against an action of the switch spring and moving the switch operating rod in a direction for separation relative to the switch.

DETAILED DESCRIPTION OF THE INVENTION

Hereinbelow, description is made with regard to a control booster according to a first embodiment of the present invention, with reference to FIGS. 1 to 4.

Figure 1:
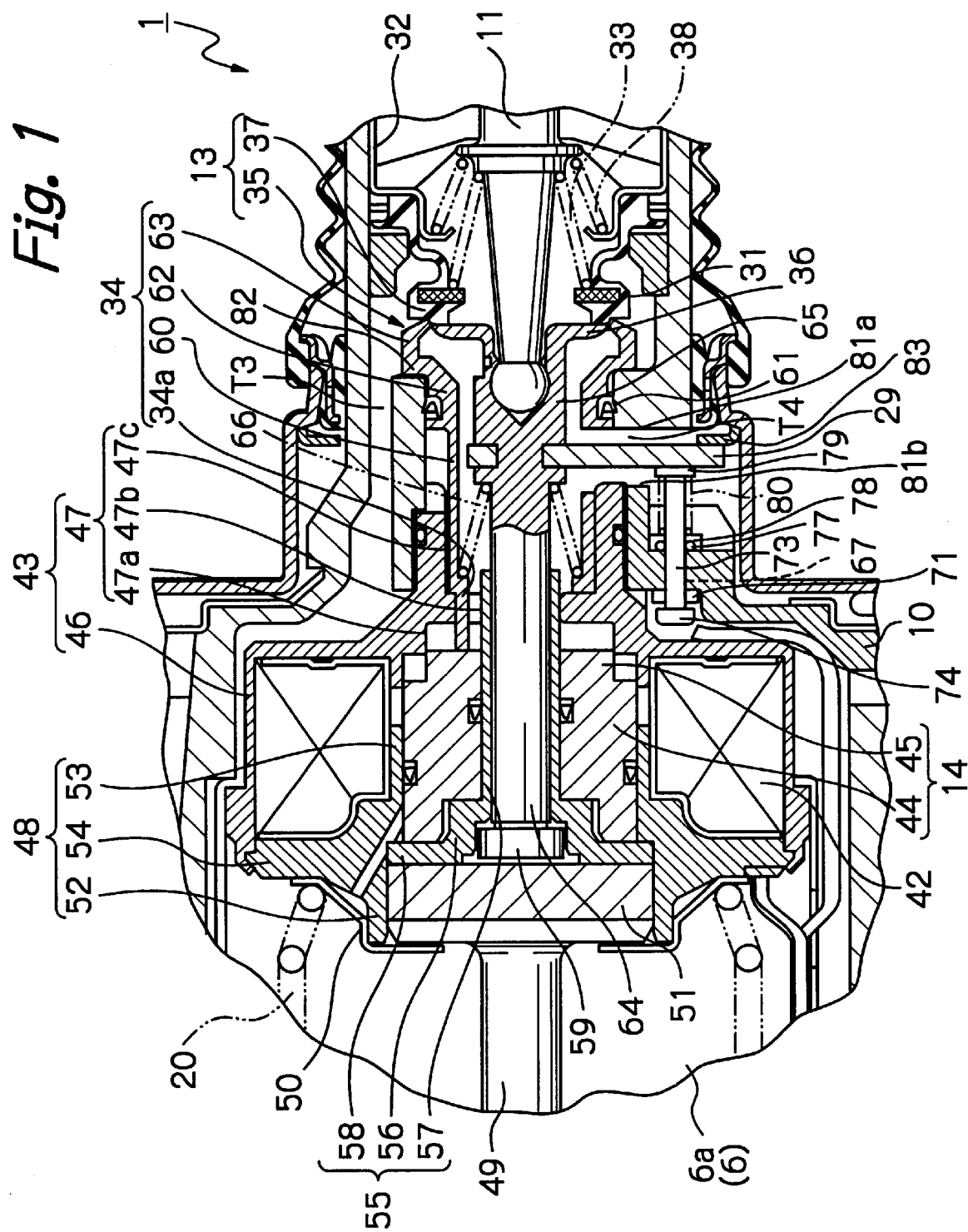
FIG. 1 is a cross-sectional view (an enlarged view of a part of FIG. 2) showing a first embodiment of the present invention.
Figure 2:
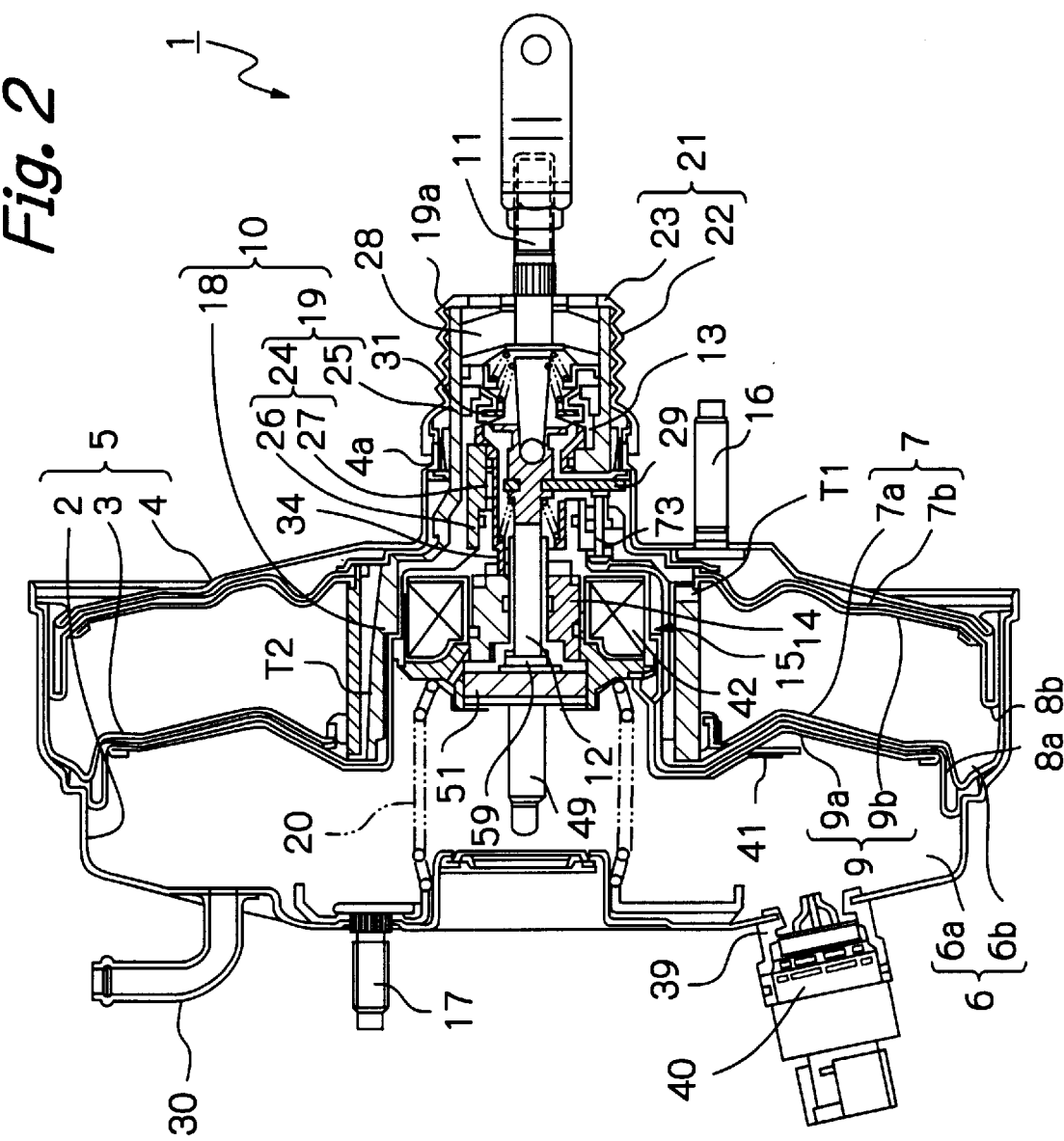
FIG. 2 is a cross-sectional view of a control booster of FIG. 1.

In FIGS. 1 and 2, a control booster 1 generally comprises: a housing 5 including a front shell 2, a center shell 3 and a rear shell 4; a front power piston 9a provided in the housing 5 and including a front diaphragm 8a which divides a space (not designated by a reference numeral or character) defined by the front shell 2 and the center shell 3 of the housing 5 into a front constant pressure chamber 6a and a front variable pressure chamber 7a; a rear power piston 9b provided in the housing 5 and including a second diaphragm 8b which divides a space (not designated by a reference numeral or character) defined by the center shell 3 and the rear shell 4 of the housing 5 into a rear constant pressure chamber 6b and a rear variable pressure chamber 7b; a generally cylindrical valve body 10 hermetically fitted into respective openings formed in the front power piston 9a and the rear power piston 9b (hereinafter, the front power piston 9a and the rear power piston 9b are frequently referred to collectively as "the power pistons 9") and supported by the power pistons 9; a plunger 12 connected to an input rod 11 associated with a brake pedal (not shown) and provided in the valve body 10; a valve mechanism 13 provided in the valve body 10 and adapted to control the supply of a working fluid to the front variable pressure chamber 7a and the rear variable pressure chamber 7b in accordance with relative movement of the plunger 12 relative to the valve body 10; and a solenoid mechanism 15 (an electromagnetic bias means) provided in the valve body 10 and adapted to operate the valve mechanism 13 by means of an armature 14 (a movable element), independently of operation of the valve mechanism 13 based on displacement of the input rod 11 associated with the brake pedal (not shown).

The front constant pressure chamber 6a and the rear constant pressure chamber 6b communicate with each other through a passage T1 formed in the valve body 10. Hereinafter, the front constant pressure chamber 6a and the rear constant pressure chamber 6b are frequently referred to collectively as "the constant pressure chambers 6".

The front variable pressure chamber 7a and the rear variable pressure chamber 7b communicate with each other through a passage T2 formed in the valve body 10. Hereinafter, the front variable pressure chamber 7a and the rear variable pressure chamber 7b are frequently referred to collectively as "the variable pressure chambers 7".

The control booster is mounted on a vehicle body, although not shown, by means of a stud bolt 16 connected to the rear shell 4. Further, the control booster is attached to a master cylinder, although not shown, by means of a stud bolt 17 connected to the front shell 2.

The valve body 10 comprises a valve body large-diameter cylinder portion 18 hermetically fitted into the openings of the power pistons 9 and an extension cylinder portion 19 connected to the valve body large-diameter cylinder portion 18, which is hermetically and slidably fitted into the rear shell 4 and extends rearward of the rear shell 4. The valve body 10 is biased in a rightward direction in FIG. 1, by means of a spring (a valve body return spring) 20 provided between the valve body 10 and the front shell 2.

A boot-shaped cover 21 made of a flexible member in the form of a bottomed cylinder is held between an opening 19a of the extension cylinder portion 19 and a cylindrical opening 4a of the rear shell 4. The cover 21 comprises a cylindrical cover body 22 having a distal end portion thereof substantially hermetically held on the cylindrical opening 4a of the rear shell 4 and also comprises a cover bottom 23 connected to the cover body 22. The cover bottom 23 has a peripheral edge portion thereof substantially hermetically held on the opening 19a of the extension cylinder portion 19. The input rod 11 extends through a central portion of the cover bottom 23 and an opening (not designated by a reference numeral or character) for passage of atmospheric air (the working fluid) is formed in an area between the peripheral end portion and the central portion of the cover bottom 23.

A portion 24 of the extension cylinder portion 19 on a side of the valve body large-diameter cylinder portion 18 (hereinafter, referred to as "the extension cylinder thick-walled portion 24") is thick-walled, such that it has a smaller inner diameter than each of a portion 25 of the extension cylinder portion 19 on a side of the opening (hereinafter, referred to as "the extension cylinder opening-side portion 25") and the valve body large-diameter cylinder portion 18. A portion 26 of the extension cylinder thick-walled portion 24 on a side of the valve body large-diameter cylinder portion 18 (hereinafter, referred to as "the thick-walled large-diameter portion 26") has an inner diameter set to be larger than that of a portion 27 of the extension cylinder thick-walled portion 24 on a side of the extension cylinder opening-side portion 25 (hereinafter, referred to as "the thick-walled small-diameter portion 27").

The extension cylinder opening-side portion 25 contains a filter 28 which functions as a silencer and an air purifier. Atmospheric air is introduced through the filter 28 into the valve body 10.

Passages T3 and T4 are formed in the extension cylinder thick-walled portion 24. One end of the passage T3 communicates with the constant pressure chambers 6 through the valve body large-diameter cylinder portion 18, while the other end of the passage T3 extends in an axial direction and opens to the extension cylinder opening-side portion 25. One end of the passage T4 opens to the variable pressure chambers 7, while the other end of the passage T4 extends in a radial direction and opens to the inside of the thick-walled portion. The passage T4 also serves as an opening for insertion of a stop key 29 which is described later. The stop key 29 is engaged with the plunger 12 and associated with the plunger 12 and hence the input rod 11.

The constant pressure chambers 6 are connected through a connecting pipe 30 to a negative pressure source such as an intake manifold of an engine, although not shown. The pressure in the constant pressure chambers 6 is constantly negative.

In the extension cylinder portion 19, a poppet valve 31 capable of elastic deformation is provided at a position in the vicinity of an opening of the passage T3. A proximal end of the poppet valve 31 is fixed to an inner wall surface of the extension cylinder portion 19 by means of a press member 32. A valve bias spring 33 is provided between a distal end of the poppet valve 31 and the input rod 11. The valve bias spring 33 biases the distal end of the poppet valve 31 in a leftward direction in FIG. 1 so that the distal end of the poppet valve 31 abuts against a control piston 34 (a valve seat for a vacuum valve 35) which is described later and a flange 36 of the plunger 12 (hereinafter, referred to as "the plunger flange 36"; a valve seat for an atmospheric air valve 37). The passage T3 is closed (the vacuum valve 35 is closed) by bringing the distal end of the poppet valve 31 into contact with the control piston 34 (the valve seat for the vacuum valve 35), and passage of atmospheric air to the variable pressure chambers 7 through the passage T4 is prevented by bringing the distal end of the poppet valve 31 into contact with the plunger flange 36 (the valve seat for the atmospheric air valve 37). The poppet valve 31 and the control piston 34 (the valve seat) provide the vacuum valve 35, and the poppet valve 31 and the plunger flange 36 provide the atmospheric air valve 37. In this embodiment, the vacuum valve 35 and the atmospheric air valve 37 provide the valve mechanism 13.

An input rod return spring 38 is provided between the press member 32 and the input rod 11 and biases the input rod 11 in a rearward direction (in the rightward direction of FIG. 1).

The input rod 11 is associated with the brake pedal (not shown) and has a distal end thereof provided within the extension cylinder portion 19.

The distal end of the input rod 11 is connected to the plunger 12 which is arranged in a shaft-like form and associated with the input rod 11.

The solenoid mechanism 15 generally comprises: a solenoid 42 having an extension wire 41 connected thereto, which wire is used for a plug 40 which is hermetically connected to a connector portion 39 provided in the front shell 2; a solenoid holding element 43 made of a magnetic material for holding the solenoid 42; and the armature 14 (the movable element) in a generally cylindrical form, which is adapted to be displaced in the rightward direction in FIG. 1 by means of an electromagnetic force of the solenoid 42 generated by electrifying or energizing the solenoid 42. The armature 14 comprises an armature body 44 having predetermined inner and outer diameters and an armature small-diameter portion 45 connected to the armature body 44. The armature small-diameter portion 45 has an outer diameter smaller than that of the armature body 44 and an inner diameter equal to that of the armature body 44. A shaft portion 34a of the control piston 34 in a generally cylindrical form is capable of abutting against an end of the armature small-diameter portion 45.

The solenoid holding element 43 comprises a dual cylinder portion 46 containing the solenoid 42 on a side of an opening thereof and a cylindrical extension portion (a holding element extension portion) 47 extending from a closed side of the dual cylinder portion 46. The holding element extension portion 47 has an inner diameter varied in a stepwise manner in a direction from a proximal end to a distal end thereof so that it comprises a large-inner-diameter portion (a first extension portion) 47a, a small-inner-diameter portion (a second extension portion) 47b and an intermediate-inner-diameter portion (a third extension portion) 47c arranged in this order in the above-mentioned direction. Outer diameters of the first extension portion 47a and the second extension portion 47b gradually decrease toward the third extension portion 47c. The inner diameter of the first extension portion 47a is slightly larger than the outer diameter of the armature small-diameter portion 45. An outer diameter of the third extension portion 47c is slightly smaller than the inner diameter of the thick-walled large-diameter portion 26.

The solenoid holding element 43 is positioned in the valve body 10, such that the dual cylinder portion 46 is located in the valve body large-diameter cylinder portion 18 and the third extension portion 47c is inserted into the thick-walled large-diameter portion 26.

The opening of the dual cylinder portion 46 of the solenoid holding element 43 is connected to an output rod fitting member 48 in a generally cylindrical form. A proximal end (not designated by a reference numeral or character) of an output rod 49, which rod is connected to a piston of the master cylinder (not shown), is fitted into a distal end of the output rod fitting member 48. The output rod fitting member 48 and a pressing plate 50 hold the output rod 49 in a manner such that the output rod 49 is axially movable within an opening of the output rod fitting member 48. The pressing plate 50 also serves as a spring receiver for the valve body return spring 20.

The output rod fitting member 48 comprises: an output rod fitting member body 52 containing the proximal end of the output rod 49 and a reaction disk 51 made of an elastic material such as a rubber; an output rod fitting member extension portion 53 connected to the output rod fitting member body 52 and having an inner diameter smaller than that of the output rod fitting member body 52 and equal to that of the dual cylinder portion 46; and a flange (an output rod fitting member flange) 54 protruding radially outward of the output rod fitting member body 52 and fitted into a cylindrical portion (not designated by a reference numeral or character) formed outward of the dual cylinder portion 46.

A generally cylindrical intermediate member 55 is provided between the output rod fitting member 48 and the armature 14, and the plunger 12. The generally cylindrical intermediate member 55 is fitted on the plunger 12.

The intermediate member 55 generally comprises: a bottomed cylinder portion (an intermediate member bottomed cylinder portion) 56 contained in an annular recess (not designated by a reference numeral or character) formed in the armature body 44; and intermediate member extension portion 57 connected to the bottom of the intermediate member bottomed cylinder portion 56 and having the plunger 12 fitted thereinto; and a flange (an intermediate member flange) 58 protruding outward of an open end of the intermediate member bottomed cylinder portion 56. The reaction disk 51 is disposed between the intermediate member flange 58 and the proximal end of the output rod 49. The intermediate member flange 58 is contained in the output rod fitting member body 52 so that it is capable of abutting against the reaction disk 51. A circular disk member 59 provided between the reaction disk 51 and the plunger 12 is contained in the intermediate member bottomed cylinder portion 56.

The control piston 34 generally comprises: a control piston body 60 in the form of a bottomed cylinder having an outer diameter slightly smaller than the inner diameter of the third extension portion 47c; the above-mentioned shaft portion 34a extending from the bottom (not designated by a reference numeral or character) of the control piston body 60 through a through-hole (not designated by a reference numeral or character) formed in the second extension portion 47b so that it is capable of abutting against the armature 14; a control piston slide portion 62 formed at a distal end portion of the control piston body 60 and slidably inserted into the thick-walled small-diameter portion 27 with a seal member 61 being provided therebetween; and a control piston valve seat 63 connected to the control piston slide portion 62 through a stepped portion 82 and providing the valve seat for the vacuum valve 35.

The plunger 12 comprises: a shaft portion (a plunger shaft portion) 64 extending through the intermediate member extension portion 57 of the intermediate member 55; a plunger proximal end portion 65 connected to the plunger shaft portion 64, which has a larger diameter than the plunger shaft portion 64 and has an opening (not designated by a reference numeral or character) formed therein for receiving the distal end of the input rod 11; and the above-mentioned plunger flange 36 (providing the valve seat for the atmospheric air valve 37) protruding radially outward of an end portion of the plunger proximal end portion 65. An annular groove (not designated by a reference numeral or character) is formed on an outer circumferential surface of the plunger proximal end portion 65, and the stop key 29 extending through the passage T4 is fitted in the groove. The stop key 29 restricts displacement of the valve body 10 in the housing 5 in the rearward direction and axial relative displacement of the plunger 12 relative to the valve body 10 in the rearward direction. In an initial state shown in FIG. 1, no pressure is applied to the input rod 11 (the brake pedal is not operated), no current is applied to the solenoid 42 (an automatic brake is not operated) and the pressure in the constant pressure chambers 6 and the pressure in the variable pressure chambers 7 are the same (negative) pressure.

A return spring (a control piston return spring) 66 is provided between the plunger proximal end portion 65 and the control piston 34 and biases the plunger proximal end portion 65 and the control piston 34 (and hence the armature 14) in a direction for separation with respect to the axial direction.

A recess (not designated by a reference numeral or character) is formed at a portion of the valve body 10 facing the constant pressure chambers 6 in the vicinity of the passage T4. A switch 67 is contained in the recess for detecting relative movement of the input rod 11 relative to the valve body 10. Two pins 68 (shown in FIG. 3) provided in the solenoid holding element 43 extend through the switch 67, to thereby fix the switch 67 to the solenoid holding element 43 (and hence the valve body 10).

Figure 3:
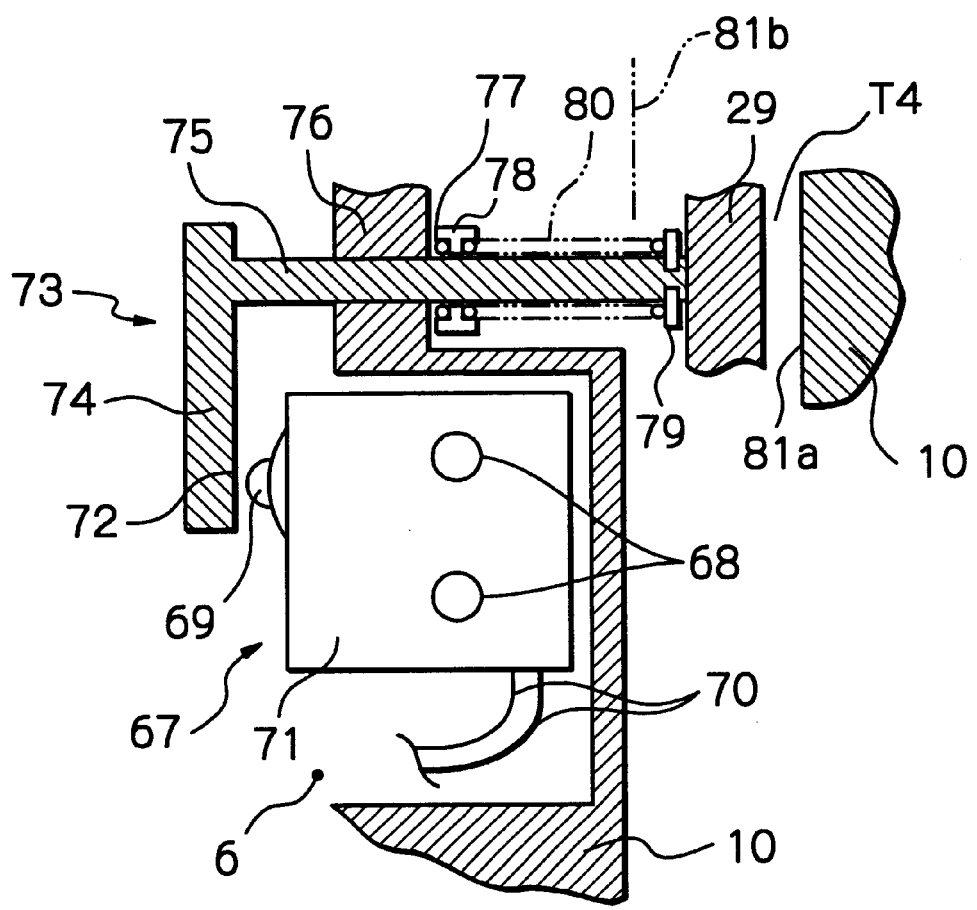
FIG. 3 is a cross-sectional view of a part of the control booster of FIG. 1 as viewed from below in FIG. 1, showing a state of attachment of a switch shown in FIG. 1.

As shown in FIG. 3, the switch 67 comprises a contact operating element 69 and a switch body 71 having the contact operating element 69 exposed on an outer surface thereof and containing a plurality of lead wires 70. The switch 67 is disposed such that the contact operating element 69 faces the rear constant pressure chamber 6b (the left side in FIG. 3).

A switch operating rod 73 having an abutment portion 72 for abutment against the contact operating element 69 is disposed in the vicinity of the switch 67. The switch operating rod 73 comprises: an operating rod portion 74 in a plate form which includes the abutment portion 72; and a shaft-like operating rod body 75 connected to the operating rod portion 74 so that it extends perpendicularly to the operating rod portion 74. The operating rod body 75 extends through a through-hole 76 formed in the valve body 10 and has a distal end portion thereof facing the stop key 29. A seal member 77 is provided at an opening of the through-hole 76 of the valve body 10 on a side of the passage T4, so as to enable sliding movement of the operating rod body 75 relative to the valve body 10 in a hermetic condition. A guide 78 is provided in the valve body 10 so as to hold the seal member 77 for positioning of the seal member 77. A retaining ring 79 is fixed to the distal end portion of the operating rod body 75. A switch spring 80 is provided between the retaining ring 79 and the guide 78. The switch spring 80 biases the abutment portion 72 in a direction for pressing the contact operating element 69 (in a direction for bringing the distal end portion of the operating rod body 75 into contact with the stop key 29). The guide 78 conducts positioning of a seal member (not shown) and guides the switch spring 80.

The length of the operating rod body 75 is determined, based on the width of the passage [the distance between the surfaces of the valve body 10 facing the stop key 29, namely, a rear-side abutment surface 81*a* (on the right side in FIG. 1) and a front-side abutment surface 81*b* (on the left side in FIG. 1)], a relative displacement between the input rod 11 (and hence the plunger 12 and the stop key 29) and the valve body 10 when a differential pressure is generated by operation of the input rod 11, a space S (not shown) between the stepped portion 82 of the control piston 34 (formed between the control piston slide portion 62 and the control piston valve seat 63) and the thick-walled small-diameter portion 27, which space is formed when the solenoid mechanism 15 is operated (that is, when the automatic brake is operated), etc.

Figure 4:
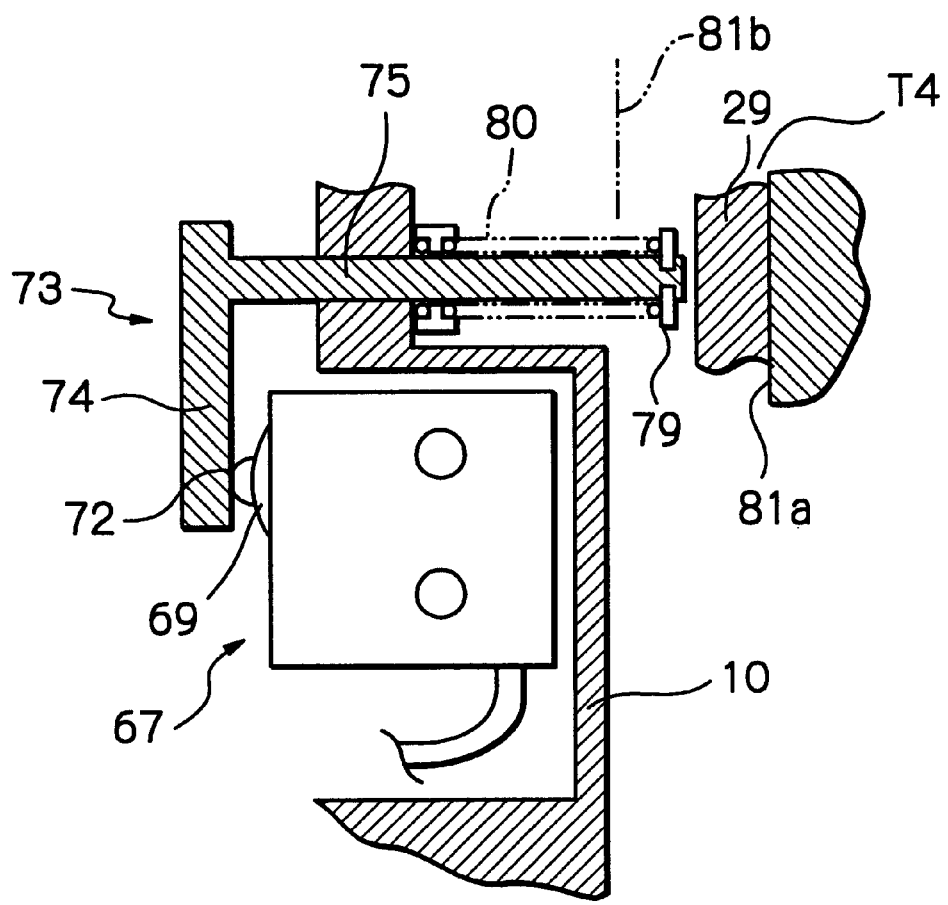
FIG. 4 is a cross-sectional view of a part of the control booster of FIG. 1 as viewed from below in FIG. 1, in which a movable contact presses a contact operating element of the switch shown in FIG. 3.

As will be described later, when the solenoid mechanism 15 is operated in the state shown in FIG. 1, the control piston 34 presses the poppet valve 31 in the rightward direction in FIG. 1, so that the atmospheric air valve 37 is opened [in this state, the space S (not shown) is formed between the stepped portion 82 and the thick-walled small-diameter portion 27]. Consequently, a differential pressure is generated between the constant pressure chambers 6 and the variable pressure chambers 7 and, while the space S is maintained, the valve body 10 advances in the leftward direction in FIG. 1 due to the differential pressure. In this instance, as shown in FIG. 4, a right-side surface of the stop key 29 is in contact with the rear-side abutment surface 81*a* (a reaction force of the switch 67 and a spring force of the switch spring 80 are balanced). In this state, when the brake pedal is depressed and the input rod 11 advances, the stop key 29 associated with the input rod 11 moves in the leftward direction in FIG. 1 and is disposed in a positional relationship such as that shown in FIG. 3 with respect to the valve body, in which the switch 67 is reversed (the contact operating element 69 which has been pressed by the abutment portion 72 shifts to non-pressed position). Operation of the brake pedal during the automatic brake operation can be detected from the above-mentioned reversal of the switch 67.

In the control booster 1 when neither the brake pedal nor the automatic brake is operated, as shown in FIG. 1, the atmospheric air valve 37 and the vacuum valve 35 are closed, while the stop key 29 in the passage T4 in the valve body 10 is located at an intermediate position with respect to the axial direction of the valve body 10 (at this position of the stop key 29, the switch 67 is off). In FIG. 1, reference numeral 83 denotes a stop key return restricting member formed in the rear shell 10. The stop key 29 located at the intermediate position is in contact with the stop key return restricting member 83, as shown in FIG. 1.

The control booster 1 is arranged as mentioned above. When the brake pedal is operated during non-operation of the automatic brake, the control booster 1 operates in a manner such as explained below.

(1) When the brake pedal is depressed so as to press the input rod 11, the plunger 12 advances (in the leftward direction in FIG. 1) from the position shown in FIG. 1. In accordance with advancement of the input rod 11 and the plunger 12, the stop key 29 is separated from the stop key return restricting member 83 and advances through the passage T4. That is, the stop key 29 moves from the intermediate position (FIG. 1) toward the front-side abutment surface 81*b* as shown in FIG. 3.

When the plunger 12 (and hence the plunger flange 36) advances from the position in FIG. 1 relative to the valve body 10, the atmospheric air valve 37 opens. Consequently, the pressure in the variable pressure chambers 7 increases, to thereby generate a differential pressure between the variable pressure chambers 7 and the constant pressure chambers 6. Due to the effect of the differential pressure, the valve body 10 advances relative to the housing 5. When the valve body 10 moves, a thrust based on the differential pressure is generated in the output rod 49 through the reaction disk 51. In this instance, based on a reaction force generated in the output rod 49, the reaction disk 51 is deformed and in contact with the plunger 12 through the circular disk portion 59. Consequently, an output reaction force is transmitted to the input rod 11.

When the magnitude of the force applied to the input rod 11 based on operation of the brake pedal (i.e., the magnitude of the force for depressing the brake pedal) and the magnitude of the reaction force transmitted from the output rod 49 to the input rod 11 through the reaction disk 51 and the plunger 12 are balanced, both the atmospheric air valve 37 and the vacuum valve 35 are closed and an output of the control booster 1 becomes constant. Therefore, in this state, the stop key 29 which has been moved from the intermediate position through the passage T4 toward the front-side abutment surface 81*b* is returned to the intermediate position (FIG. 1).

(2) When an operating force for the brake pedal is reduced or released after the stop key 29 is returned to the above-mentioned position (the intermediate position), to thereby reduce the magnitude of the force applied to the input rod 11 (the magnitude of the force for depressing the brake pedal), the input rod 11 moves in the rearward direction relative to the valve body 10, due to the effect of the forces of the input rod return spring 38 and the valve bias spring 33 and the reaction force from the reaction disk 51 (acting on a side of the circular disk portion 59 remote from the reaction disk).

Consequently, the vacuum valve 35 opens and the variable pressure chambers 7 communicate with the constant pressure chambers 6 through the passage T4, the vacuum valve 35 and the passage T3. Therefore, the pressure in the variable pressure chambers 7 decreases and the valve body 10 moves in the rearward direction relative to the housing 5.

Thus, the input rod 11 moves in the rearward direction relative to the valve body 10 and the valve body 10 moves in the rearward direction relative to the housing 5. Consequently, the stop key 29 moves from the intermediate position through the passage T4 toward the rear-side abutment surface 81*a* (as shown in FIG. 4).

When the magnitude of the force applied to the input rod 11 based on reduction or release of the operating force for the brake pedal (i.e., the magnitude of the force for depressing the brake pedal) and the magnitude of the reaction force transmitted from the output rod 49 to the input rod 11 through the reaction disk 51 and the plunger 12 are balanced, both the atmospheric air valve 37 and the vacuum valve 35 are closed again, and the output of the control booster 1 becomes constant. Therefore, in this state, the stop key 29 which has been moved from the intermediate position through the passage T4 toward the rear-side abutment surface 81*a* (as shown in FIG. 4) advances and returns to the intermediate position (FIG. 1). When the pressure in the variable pressure chambers 7 becomes equal to the pressure in the constant pressure chambers 6, the stop key 29 abuts against the stop key return restricting member 83 provided in the rear shell 4 (as shown in FIG. 1).

(3) When the automatic brake (operated by electrifying the solenoid 42) is operated during non-operation of the brake pedal, the control booster operates as follows. First, by electrifying the solenoid 42, a force acting in the rightward direction in FIG. 1 is applied to the armature 14 and the control piston 34 receives the force of the armature 14 acting in the rightward direction in FIG. 1. In this instance, the control piston 34 moves in the rightward direction in FIG. 1 (in the rearward direction relative to the valve body 10) against the biasing force of the control piston return spring 66, the biasing force of the valve bias spring 33 and a differential pressure acting on the poppet valve 31, while forming the space S between the stepped portion 82 and the thick-walled small-diameter portion 27. Consequently, the poppet valve 31 is separated from the valve seat (the plunger flange 36) of the plunger 12 for the atmospheric air valve 37 and only the atmospheric air valve 37 opens. Due to this opening of the atmospheric air valve 37, atmospheric air is introduced into the variable pressure chambers 7 through the passage T4, to thereby increase the pressure in the variable pressure chambers 7. Consequently, a differential pressure is generated between the constant pressure chambers 6 and the variable pressure chambers 7, and due to this differential pressure the valve body 10 advances relative to the housing 5.

In this instance, the input rod 11 and the plunger 12 are not engaged with the power pistons 9 (and hence the valve body 10) and the brake pedal is not operated. Therefore, the input rod 11 and the plunger 12 are not displaced relative to the housing 5. However, the stop key 29 provided in the plunger 12 moves relative to the valve body 10 in accordance with advancement of the valve body 10, and is located rearward of the intermediate position (FIG. 1) on a side of the rear-side abutment surface 81a (as shown in FIG. 4). In this instance, the abutment portion 72 presses the contact operating element 69 of the switch 67 due to the effect of biasing force of the switch spring 80, and the reaction force of the switch 67 and the spring force of the switch spring 80 are balanced.

Thereafter, when an electromagnetic force of the solenoid 42 is adjusted to a level such that the control piston 34 abuts against the poppet valve 31 only against the force of the control piston return spring 66 (that is, when the electromagnetic force of the solenoid 42 is adjusted to a level balancing the force of the valve bias spring 33 and the space S is fixed to a certain amount), relative movement of the control piston 34 relative to the housing 5 accompanies the above-mentioned movement of the valve body 10, due to the effect of force of the valve bias spring 33 and the differential pressure acting on the poppet valve 31, while maintaining a closed position of the vacuum valve 35 (the space S is formed between the stepped portion 82 and the thick-walled small-diameter portion 27 in this position of the vacuum valve 35). Thus, the control piston 34 moves from a position where it separates the poppet valve 31 from the plunger flange 36 to a position where the poppet valve 31 abuts against the plunger flange 36, to thereby close the atmospheric air valve 37. Thus, both the vacuum valve 35 and the atmospheric air valve 37 are closed, but the abutment portion 72 continues pressing the contact operating element 69 of the switch 67 and the reaction force of the switch 67 and the spring force of the switch spring 80 are balanced.

It should be noted that in the above-mentioned state, the valve body 10 is located at an advanced position relative to the input rod 11 and the plunger 12.

Because the valve body 10 remains advanced, the stop key 29 is still located rearward of the intermediate position (in FIG. 1) on a side of the rear-side abutment surface 81a (as shown in FIG. 4).

(4) Further, when the electromagnetic force of the solenoid 42 is adjusted so that the control piston 34 is not capable of abutting against the poppet valve 31 only against the force of the control piston return spring 66 (that is, the electromagnetic force of the solenoid 42 is adjusted so that the space S is reduced by the action of the force of the control piston return spring 66), the control piston 34 is separated from the poppet valve 31 under force of the control piston return spring 66, to thereby open the vacuum valve 35. Due to this opening of the vacuum valve 35, the variable pressure chambers 7 are reduced in pressure and the differential pressure between the variable pressure chambers 7 and the constant pressure chambers 6 is reduced. Consequently, the valve body 10 moves in the rearward direction relative to the housing 5. When the valve body 10 returns to the initial state, the stop key 29, which has been moved toward the rear-side abutment surface 81a through the passage T4 moves to the intermediate position shown in FIG. 1.

(5) On the other hand, when the brake pedal is depressed during the automatic brake operation in a state where the vacuum valve 35 and the atmospheric air valve 37 have been closed by adjustment of the electromagnetic force of the solenoid 42 in the above-mentioned manner, the input rod 11 and the plunger 12 advance relative to the valve body 10, so that the stop key 29 moves from the position (not shown) on a side of the rear-side abutment surface 81a through the passage T4 to the intermediate position (FIG. 1).

Therefore, when the force inputted to the input rod 11 by depressing the brake pedal is larger than the reaction force applied to the plunger 12 due to a braking force generated by the automatic brake operation, the stop key 29 moves from the position on a side of the rear-side abutment surface 81a toward the intermediate position shown in FIG. 1.

Further, for moving the stop key 29 from the position on a side of the rear-side abutment surface 81a (not shown; a position where the reaction force of the switch 67 acting on the switch operating rod 73 and the spring force of the spring are balanced) to the intermediate position (FIG. 1), when the stop key 29 is located on a side of the rear-side abutment surface 81a (reference is made to FIG. 4), only the return force of the switch spring 80 acts on the switch 67. On the other hand, when the stop key 29 moves to the intermediate position (FIG. 1), the abutment portion 72 is separated from the contact operating element 69 (that is, the switch operating rod 73 moves in a direction for separation relative to the switch 67), so that no load is applied to the switch 67. Therefore, it is possible to avoid a situation that an excessive load is applied to the switch 67 due to operation of the brake pedal during the automatic brake operation and prevent breakage of the switch 67 due to such an excessive load. In addition, as mentioned above, operation of the brake pedal during the automatic brake operation can be detected from the turning-off of the switch 67.

(6) In an arrangement where a brake assist (BA) can be actuated during pedal-operated brake operation, the control booster operates in the below-mentioned manner when the brake pedal is released during operation of the brake assist.

When the brake assist (BA) is actuated, as described above in connection with the automatic brake, the electromagnetic force of the solenoid 42 is generated and the armature 14 moves in the rightward direction in FIG. 1, to thereby move the control piston 34 in the rightward direction. Therefore, if the brake assist is supposed to be actuated in the initial state shown in FIG. 1, the stop key 29 is moved through the passage T4 toward the rear-side abutment surface 81a by advancement of the valve body 10 due to opening of the atmospheric air valve 37. However, the brake assist operates during operation of the brake pedal. Therefore, the brake pedal continues to be depressed during operation of the brake assist, so that the stop key 29 moves toward the front-side abutment surface 81b and continues pressing the switch operating rod 73, and the switch 67 is in a state such as shown in FIG. 3. When the brake pedal is released during operation of the brake assist, as in the case of the brake assist being actuated in the initial state of FIG. 1, the stop key 29 moves through the passage T4 toward the rear-side abutment surface 81a. Therefore, release of the brake pedal during operation of the brake assist can be detected from a change in state of the stop key 29 from the state of FIG. 3 to that of FIG. 4.

In this embodiment of the present invention, operation of the brake pedal during the automatic brake operation can be detected from a change in state of the stop key 29 from the state of FIG. 4 to that of FIG. 1.

Further, in this embodiment, during operation of the brake assist based on depression of the brake pedal, release of the brake pedal can be detected from a change in state of the stop key 29 from the state of FIG. 1 to that of FIG. 4.

Figure 5:
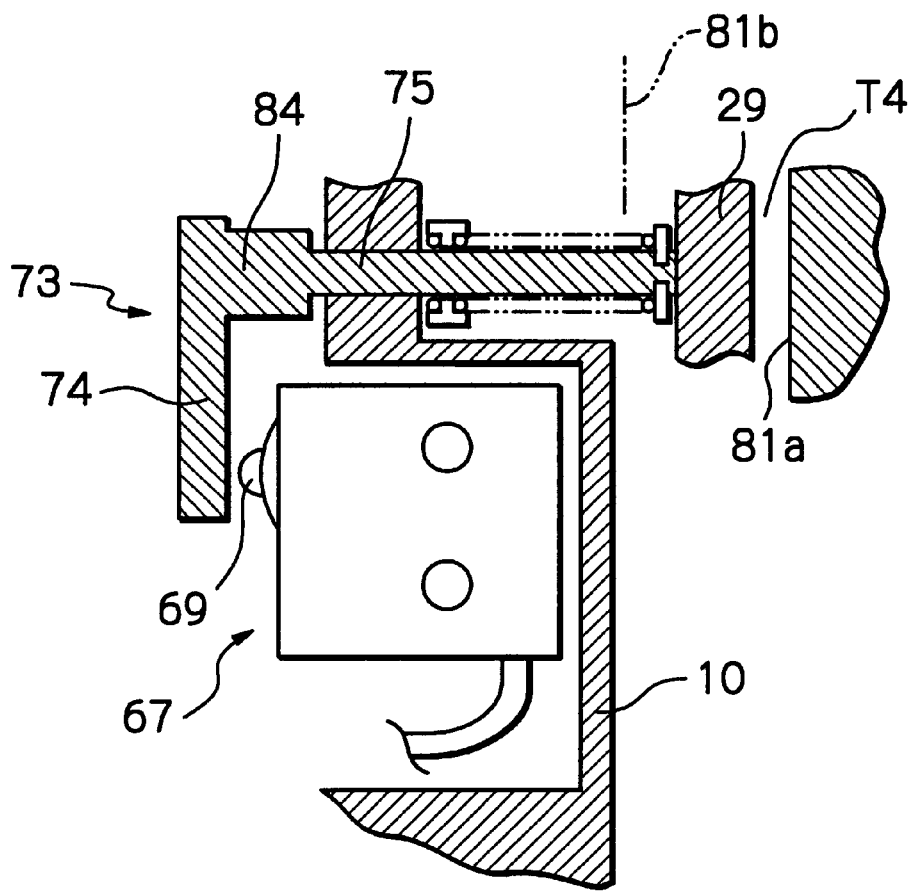
FIG. 5 is a view showing a second embodiment of the present invention.
Figure 6:
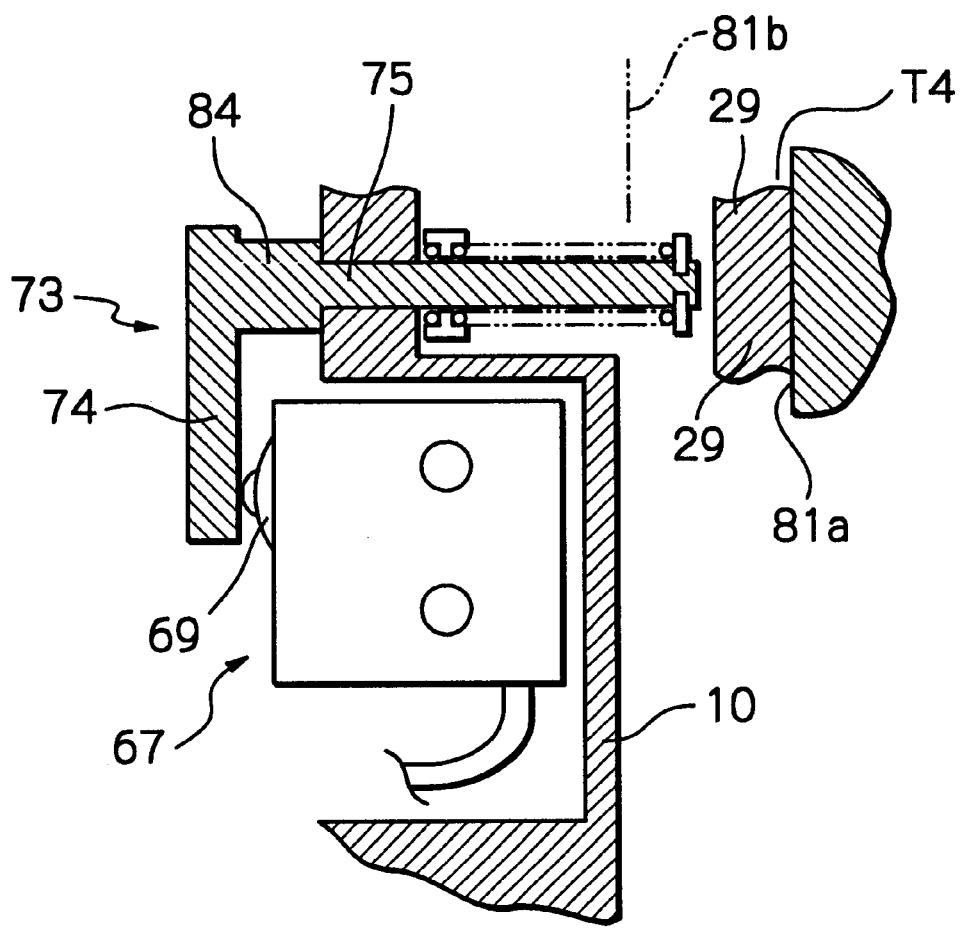
FIG. 6 is a view showing an operation of a control booster of FIG. 5.

Next, a second embodiment of the present invention is described, with reference to FIGS. 5 and 6.

In this embodiment, the control booster differs from that of the first embodiment in that a large-diameter portion 84 (a switch operating rod movement restricting mechanism) having a predetermined length and a diameter larger than that of the through-hole 76 of the valve body 10 is provided at a proximal end portion (at the operating rod portion 74) of the operating rod body 75. The remaining arrangements of the second embodiment are the same as those of the first embodiment and therefore explanation thereof is omitted.

In the second embodiment, when the switch operating rod 73 moves in the rearward direction relative to the valve body 10 due to the force of the switch spring 80 or advancement of the valve body 10, to thereby bring the abutment portion 72 into contact with the contact operating element 69, the large-diameter portion 84 abuts against the valve body 10, to thereby restrict further relative movement of the switch operating rod 73, thus suppressing the load applied to the switch 67 and preventing breakage of the switch 67. Further, the large-diameter portion 84 has a simple construction, so that the apparatus is not required to have a complicated structure for suppressing the load applied to the switch 67 and preventing breakage of the switch 67.

Figure 7:
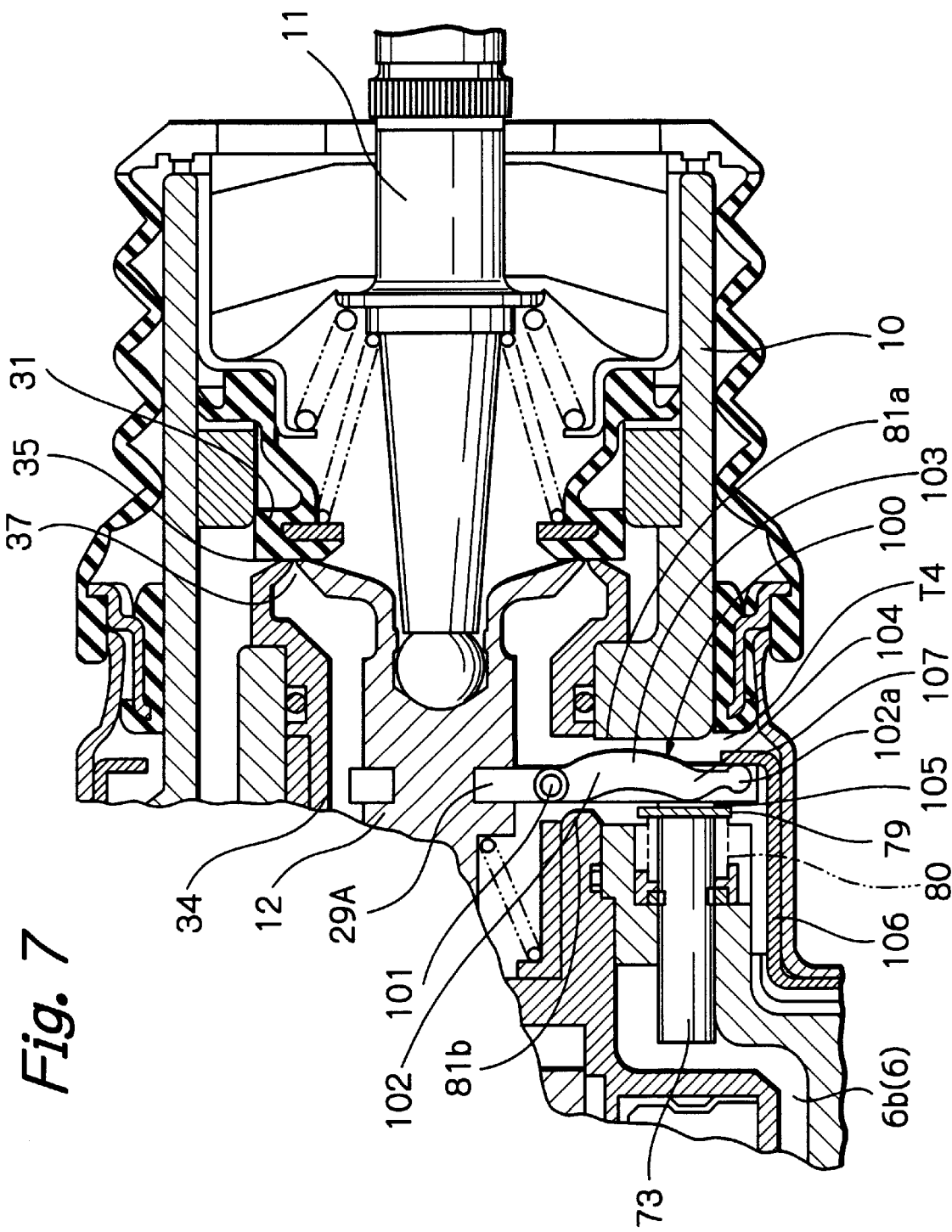
FIG. 7 is a cross-sectional view of a control booster according to a third embodiment of the present invention.
Figure 8:
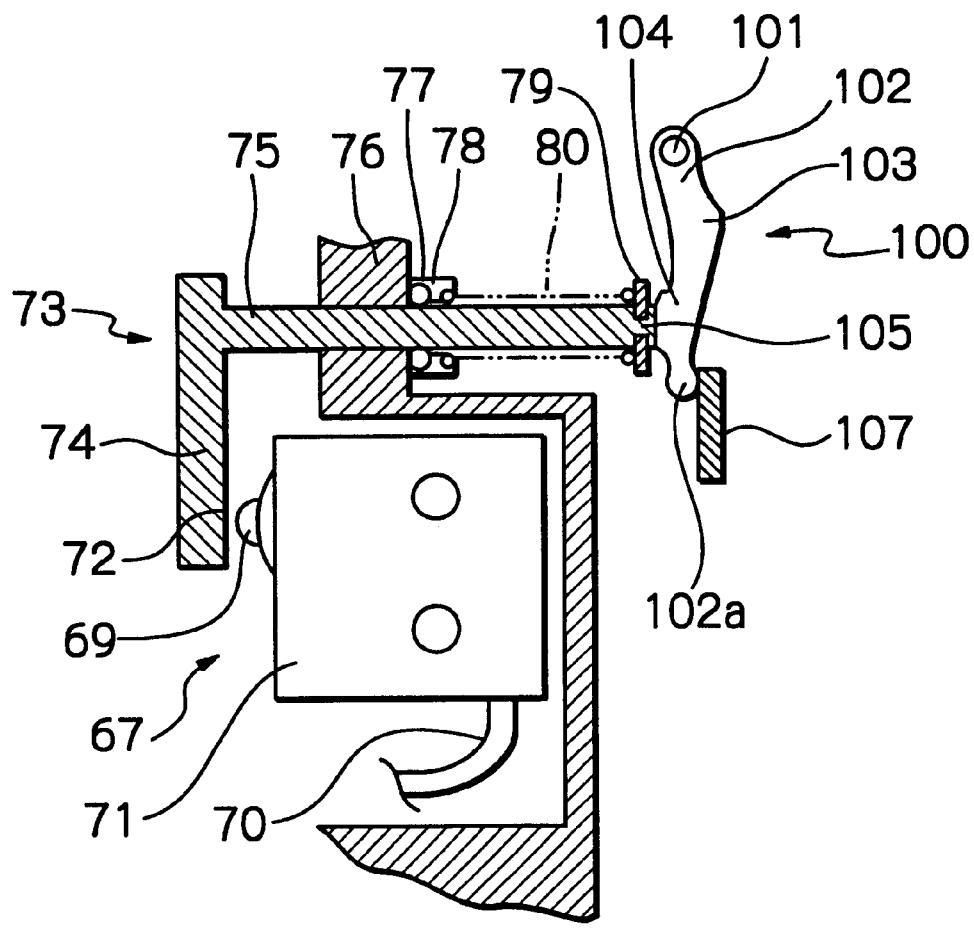
FIG. 8 is a cross-sectional view of a part of the control booster of FIG. 7 as viewed from below in FIG. 7 (wherein a pivot lever is shown in the same state as in FIG. 7 for easy understanding), showing a state of a switch shown in FIG. 7.

Next, a third embodiment of the present invention is described, with reference to FIGS. 7 to 10. The same portions as those in the first embodiment are designated by the same reference numerals or characters as used in the first embodiment and explanation thereof is omitted. Referring to FIGS. 7 and 8, a pivot lever 100 is pivotably supported on a stop key 29A through a supporting shaft 101. The supporting shaft 101 is provided at a position in the stop key 29A on a side closer to the plunger 12. The pivot lever 100 extends in a direction away from the plunger 12 (in a downward direction in FIG. 7) relative to the supporting shaft 101. Hereinafter, for convenience's sake, the portion of the pivot lever 100 extending from the supporting shaft 101 in the downward direction in FIG. 7 is referred to as "the pivot lever body 102". The pivot lever body 102 includes an arcuate portion (a first arcuate portion) 103 formed in the vicinity of the supporting shaft 101, which portion protrudes toward the rear-side abutment surface 81a of the valve body 10.

An arcuate portion (a second arcuate portion) 104 protruding on a side of the front-side abutment surface 81b is formed in the pivot lever body 102 at a position between a distal end portion 102a thereof and the first arcuate portion 103.

Figure 9:
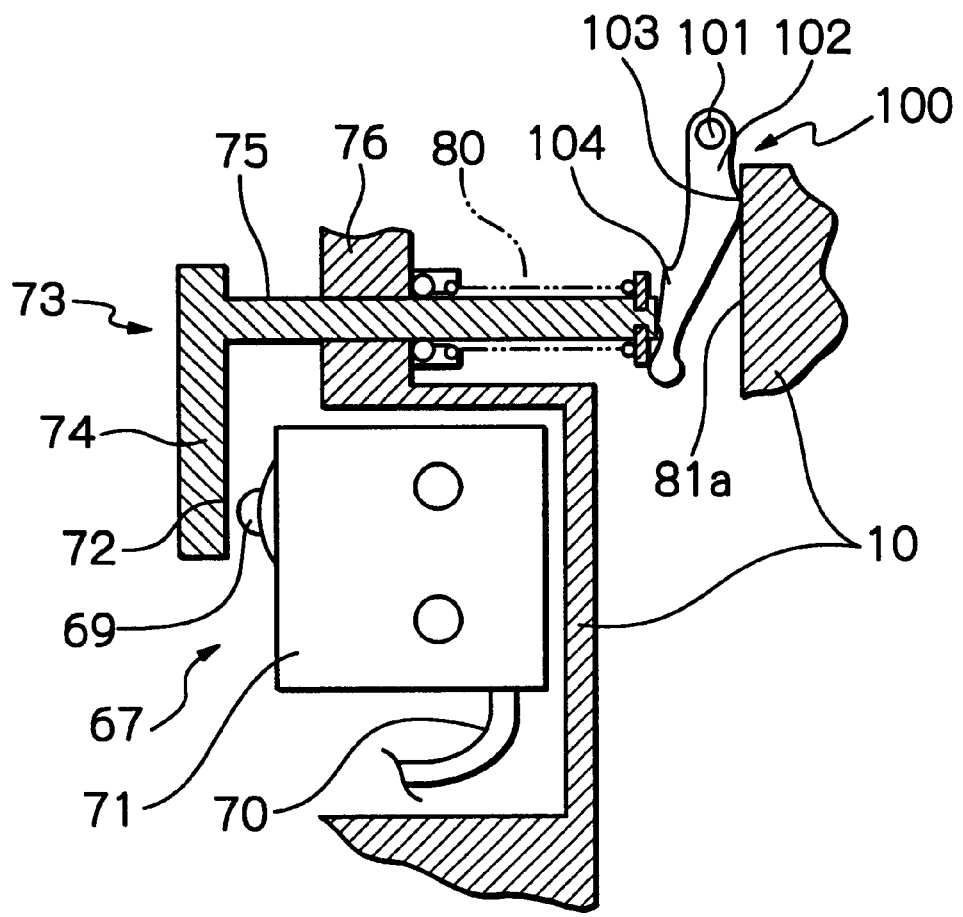
FIG. 9 is a cross-sectional view of the part of the control booster of FIG. 7 as viewed from below in FIG. 7 (wherein the pivot lever is shown in the same state as in FIG. 7 for easy understanding), showing a state of the switch when a brake pedal is not operated in an automatic brake mode of the control booster of FIG. 7.

When the plunger 12 and the valve body 10 are located in a predetermined positional relationship, the second arcuate portion 104 abuts against an end portion 105 of the switch operating rod 73 on a side where the retaining ring 79 is disposed (as shown in FIGS. 8 and 9).

A support member 106 is held on the housing 5 in the vicinity of the passage T4. A distal end portion 107 of the support member 106 is inserted into the passage T4. In a state shown in FIGS. 7 and 8 where the brake pedal is not operated, the stop key 29A and the distal end portion 102a of the pivot lever body 102 are in contact with the distal end portion 107 of the support member 106 at a predetermined angle of rotation of the pivot lever 100.

In a non-braking position where the brake pedal is not operated (FIGS. 7 and 8; a brake pedal non-operated state), the pivot lever 100 and the stop key 29A are in contact with the distal end portion 107 of the support member 106. As shown in FIGS. 7 and 8, relative rightward movement (movement toward the rear-side abutment surface 81a) of the stop key 29A relative to the valve body 10 beyond the distal end portion 107 is restricted and rotation of the pivot lever 100 on the supporting shaft 101 in a counterclockwise direction in FIG. 7 is also restricted.

In the brake pedal non-operated state, as shown in FIGS. 7 and 8, the second arcuate portion 104 of the pivot lever body 102 is in contact with the end portion 105 of the switch operating rod 73, to thereby press the switch operating rod 73 and separate the switch operating rod 73 from the contact operating element 69 of the switch 67 (so that the switch 67 is off).

The control booster of the third embodiment is arranged as mentioned above. An operation of this control booster is explained below in detail.

(1) Normal Brake Operation

When the brake pedal is operated in the non-braking position (in the state shown in FIG. 7; the brake pedal non-operated state), the plunger 12 moves in a leftward direction in FIG. 7 relative to the valve body 10. In accordance with this movement of the plunger 12, the stop key 29A and hence the supporting shaft 101 of the pivot lever 100 also move in the leftward direction in FIG. 7 relative to the valve body 10. Further, the valve body moves in the leftward direction in FIG. 7 based on operation of the brake pedal, to thereby effect relative movement of the distal end portion 107 of the support member 106 in a rightward direction in FIG. 7, and the second arcuate portion 104 of the pivot lever 100 is made movable in the rightward direction relative to the supporting shaft 101. Therefore, the switch operating rod 73 moves in the rightward direction by the action of the spring force of the switch spring 80 and, while being in contact with the second arcuate portion 104 and rotating the pivot lever 100 in the counterclockwise direction in FIG. 7, the switch operating rod 73 abuts against the switch 67 (so that the switch 67 is brought into an on-position).

In this state, the second arcuate portion 104 of the pivot lever 100 is not separated from the switch operating rod 73.

Then, the operating force for the brake pedal and the output reaction force are balanced, causing the plunger 12 to have the same positional relationship as that shown in FIG. 7, relative to the valve body 10. In this state, however, differing from the brake pedal non-operated state of FIG. 7, the pivot lever 100 is separated from the distal end portion 107 of the support member 106 and free from the restriction of rotation.

Therefore, the switch 67 is maintained at the on-position.

Thereafter, when the brake pedal is released in the above-mentioned state (where the valve body 10 and the plunger 12 have the same positional relationship as that shown in FIG. 7), the plunger 12 moves in the rightward direction in FIG. 7 relative to the valve body 10. Therefore, the supporting shaft 101 of the pivot lever 100 (together with the stop key 29A) moves from the position shown in FIG. 7 in the rightward direction in FIG. 7, relative to the valve body 10.

Consequently, the first arcuate portion 103 of the pivot lever 100 abuts against the rear-side abutment surface 81a of the valve body 10. The supporting shaft 101 of the pivot lever 100 further moves in the rightward direction in FIG. 7 while the first arcuate portion 103 is in contact with the rear-side abutment surface 81a, so that the first arcuate portion 103 is pressed by the rear-side abutment surface 81a and the pivot lever body 102 rotates about the supporting shaft 101 in a clockwise direction in FIG. 7, to thereby effect relative movement (rotation) of the second arcuate portion 104 in the leftward direction in FIG. 7.

Therefore, the pivot lever 100 moves the switch operating rod 73 in the leftward direction in FIG. 7 against the spring force of the switch spring 80. Consequently, the switch operating rod 73 is separated from the contact operating element 69 (so that the switch 67 is brought into an off-position).

When release of the brake pedal is stopped before completion and the control booster is brought into the same state as that where the operating force for the brake pedal and the output reaction force are balanced, followed by completion of release of the brake pedal, the valve body 10 and the plunger 12 return to the same positional relationship as that shown in FIG. 7.

When release of the brake pedal is completed, the state of the control booster is the same as that when the operating force for the brake pedal and the output reaction force are balanced during operation of the brake pedal, only in terms of the positional relationship between the valve body 10 and the plunger 12. The stop key 29A and the pivot lever 100 are different from those during operation of the brake pedal in that movement and rotation thereof are restricted by abutment between the distal end portion 102a of the pivot lever body 102 and the distal end portion 107 of the support member 106 so that the switch 67 is off.

(2) Automatic Brake Operation

When the automatic brake is operated (the control booster is operated in an automatic brake mode) in the non-braking position where the brake pedal is not operated, the control piston 34 moves in the rightward direction in FIG. 7 while the positional relationship between the valve body 10 and the plunger 12 shown in FIG. 7 is maintained, to thereby supply the working fluid from an operated valve (the atmospheric air valve 37) to the variable pressure chambers 7. This is fundamentally different from the operation for supply of the working fluid to the variable pressure chambers 7 in the above-mentioned normal brake operation (in which the plunger 12 moves in the leftward direction in FIG. 7 relative to the valve body 10).

Thus, due to operation of the automatic brake, the control piston 34 moves in the rightward direction in FIG. 7 to thereby open the atmospheric air valve 37, so that atmospheric air is supplied to the variable pressure chambers.

Due to the differential pressure between the variable pressure chambers 7 and the constant pressure chambers 6, the power pistons 9 and hence the valve body 10 advance (in the leftward direction in FIG. 7).

Due to this advancement of the valve body 10, the supporting shaft 101 of the pivot lever 100 (together with the stop key 29A) moves from the position in FIG. 7 in the rightward direction relative to the valve body 10. Consequently, the rear-side abutment surface 81a of the valve body 10 abuts against the first arcuate portion 103 of the pivot lever 100 (reference is made to FIG. 9) and the first arcuate portion 103 of the pivot lever body 102 rotates about the supporting shaft 101 in a clockwise direction in FIG. 9, to thereby effect relative leftward movement (rotation) of the second arcuate portion 104 and press the switch operating rod 73. Further, due to the clockwise rotation of the pivot lever body 102 in the above-mentioned manner, the switch operating rod 73 moves in a leftward direction in FIG. 9 against the spring force of the switch spring 80 and is separated from the contact operating element 69 of the switch 67 (so that the switch 67 is off) (that is, in the brake pedal non-operated state in the automatic brake mode, the switch operating rod 73 is pressed by the pivot lever 100 and separated from the contact operating element 69 of the switch 67).

Figure 10:
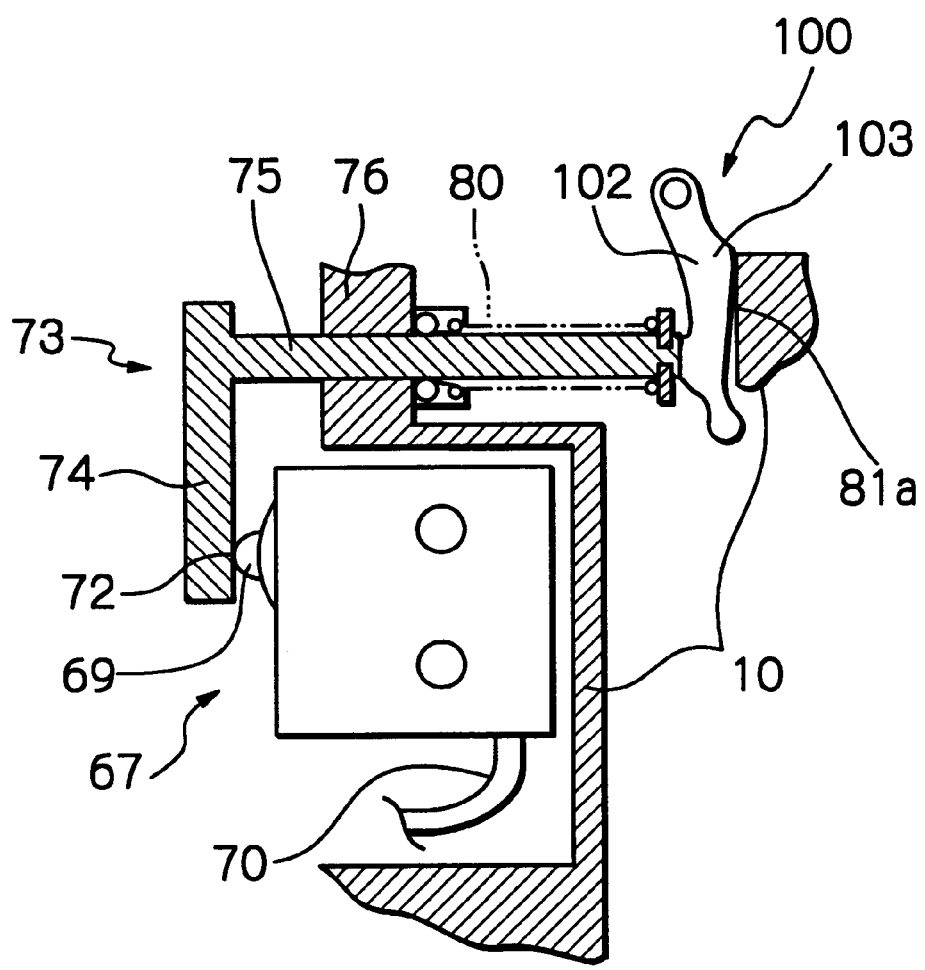
FIG. 10 is a cross-sectional view of the part of the control booster of FIG. 7 as viewed from below in FIG. 7 (wherein the pivot lever is shown in the same state as in FIG. 7 for easy understanding), showing a state of the switch when the brake pedal is operated in the automatic brake mode.

When the brake pedal is depressed (the input rod is moved in a direction for increasing the output of the booster) in a state where the vacuum valve 35 and the atmospheric air valve 37 have been closed by adjustment of the electromagnetic force of the solenoid 42 as described above in connection with the automatic brake operation (in the brake pedal non-operated state in the automatic brake mode), the input rod 11 and the plunger 12 (and hence the stop key 29A) advance relative to the valve body 10 and the pivot lever 100 is moved to a position shown in FIG. 10.

In accordance with movement of the supporting shaft 101 in the leftward direction in FIG. 9, the pivot lever 100 is rotated in the counterclockwise direction in FIG. 9 due to the balance of its own weight, while being pressed by the force of the switch spring 80 through the switch operating rod 73. When the switch operating rod 73 moves a predetermined distance in a rightward direction in FIG. 9, the switch operating rod 73 abuts against the contact operating element 69 of the switch 67 and the switch 67 is brought into the on-position (the switch operating rod is freed from the pressure of the valve body 10 applied through the pivot lever 100 and abuts against the switch 67). Thereafter, the pivot lever 100 further rotates in the counterclockwise direction in FIG. 9 and, as shown in FIG. 10, the first arcuate portion 103 is brought into contact with the rear-side abutment surface 81a.

Thus, in the brake pedal non-operated state in the automatic brake mode, as shown in FIG. 9, the switch operating rod 73 is separated from the switch 67 so that the switch 67 is off. When the brake pedal is operated in the automatic brake mode, the switch 67 is brought into the on-position (reference is made to FIG. 10). Therefore, operation of the brake pedal during the automatic brake operation can be surely detected.

For operating the switch 67, in the brake pedal non-operated state in the automatic brake mode, the switch operating rod 73 is separated from the contact operating element 69 of the switch 67, so that no excessive load is applied to the switch 67. When the brake pedal is operated in the automatic brake mode, as shown in FIG. 10, although the switch operating rod 73 abuts against the contact operating element 69 of the switch 67, this abutment is conducted only by the spring force of the switch spring 80. Therefore, an undesirably high load is not applied to the switch 67.

In the third embodiment, the pivot lever 100 is pivotably supported on the stop key 29A. However, the pivot lever 100 may be pivotably supported on the plunger 12. From the viewpoint of easy manufacture, it is preferred that the pivot lever 100 be pivotably supported on the stop key 29A as in the third embodiment.

In the above-mentioned embodiments, since the switch 67 is provided in the rear constant pressure chamber 6b (the constant pressure chambers 6), the pressure applied to the switch 67 is generally constant, so that a considerable change in pressure applied to the switch 67 can be avoided.

In the control booster of the above-mentioned Kohyo No. 10-505041 in which the switch is provided in the variable pressure chamber, a problem occurs, such that the switch is subject to atmospheric pressure each time the brake pedal is operated and therefore the pressure applied to the switch frequently changes. However, in the embodiments of the present invention, it is possible to avoid the above-mentioned problem involved in the control booster of Kohyo No. 10-505041.

Further, for installation in an engine room, the control booster is generally fixed to an inner wall of the engine room through a bolt (the stud bolt 16 in the above-mentioned embodiments) provided in a rear shell (the rear shell 4 in the above-mentioned embodiments). Therefore, from the viewpoint of easy assembly, signal wires (the extension wire 41 and the lead wire 70) externally extend from a front shell (the front shell 2 in the above embodiments). In the above embodiments, the lead wire 70 of the switch 67 is guided to the constant pressure chambers 6. The lead wire 70 does not need to be extended through the rear power piston 9b dividing the variable pressure chambers 7 and the constant pressure chambers 6 for connection to the outside of the apparatus, and high sealability at the rear power piston 9b, which is required for extending the lead wire 70 through the rear power piston 9b, becomes unnecessary.

That is, in the control booster of Kohyo No. 10-505041 in which the switch is provided in the variable pressure chamber, from the viewpoint of easy assembly, a signal wire for the switch is externally extended through the power piston dividing the variable pressure chamber and the constant pressure chamber. In this case, it is necessary to seal that portion of the power piston through which the signal wire is extended, with sufficiently high sealability for preventing unintended communication between the variable pressure chamber and the constant pressure chamber through that portion of the power piston. Due to an elaborate method required for ensuring high sealability, productivity can be lowered. In the above embodiments of the present invention, as mentioned above, there is no need to ensure high sealability, so that a lowering of productivity such as that involved in the control booster of Kohyo No. 10-505041 can be avoided.

In the first embodiment of the present invention, when the input rod is operated in a state where the reaction force of the switch acting on the switch operating rod and the spring force of the switch spring are balanced, the switch operating rod moves in a direction for separation relative to the switch. Therefore, no load is applied to the switch due to operation of the input rod when the brake pedal (and hence the input rod) is operated during the automatic brake operation. This prevents breakage of the switch, which can be caused in the related art.

In the second embodiment, the switch operating rod movement restricting mechanism suppresses the pressure of the switch operating rod applied to the contact operating element of the switch. Therefore, the load applied to the switch can be suppressed and breakage of the switch can be prevented.

Further, in the second embodiment of the present invention, a large-diameter portion having a simple construction can be arranged as the switch operating rod movement restricting mechanism, so that the control booster as a whole is not required to have a complicated structure for suppressing the load applied to the switch and preventing breakage of the switch.

In the third embodiment of the present invention, in the brake pedal non-operated state in the automatic brake mode, the switch operating rod is separated from the switch so that the switch is off. On the other hand, when the brake pedal is operated in the automatic brake mode, the switch operating rod abuts against the switch, to thereby bring the switch into the on-position. Therefore, operation of the brake pedal during the automatic brake operation can be surely detected.

For operating the switch, in the brake pedal non-operated state in the automatic brake mode, the switch operating rod is separated from the switch, so that no excessive load is applied to the switch. When the brake pedal is operated in the automatic brake mode, although the switch operating rod abuts against the switch, the abutment is conducted only by the spring force of the switch spring. Therefore, an undesirably high load is not applied to the switch, to thereby prevent breakage of the switch which can be caused in the related art.

Further, in the third embodiment, the pivot lever is pivotably supported on the stop key. This is advantageous in terms of easy manufacture, as compared to the pivot lever being supported on the plunger.

Further, in the third embodiment, since the switch is provided in the constant pressure chamber, the pressure applied to the switch is generally constant, so that a considerable change in pressure applied to the switch can be avoided.

The entire disclosure of Japanese Patent Application Nos. Hei 11-186040 filed on Jun. 30, 1999 and 2000-099506 filed on Mar. 31, 2000 is incorporated herein by reference in its entirety.

What is claimed is:

1. A control booster comprising:
   a power piston dividing an inside of a housing into a constant pressure chamber and a variable pressure chamber;
   a valve mechanism which controls supply of a working fluid to the variable pressure chamber in accordance with movement of a plunger connected to an input rod associated with a brake pedal, the valve mechanism being provided in a valve body supported by the power piston;
   an electromagnetic bias means having a movable element which operates the valve mechanism independently of operation of the input rod, the control booster being adapted to generate a thrust in the power piston due to a differential pressure generated between the variable pressure chamber and the constant pressure chamber based on operation of the valve mechanism;
   a switch for detecting relative movement of the input rod relative to the valve body;
   a switch operating rod for operating the switch; and a switch spring for biasing the switch operating rod in a direction for pushing-in a contact operating element of the switch, wherein when the input rod is operated in a direction for increasing an output of the booster in a state where a reaction force of the switch acting on the switch operating rod and a spring force of the switch spring are balanced, the switch operating rod moves in a direction for separation relative to the switch.

2. A control booster according to claim 1, further comprising a switch operating rod movement restricting mechanism so as to suppress a pressure of the switch operating rod, which pressure is applied to the contact operating element of the switch by means of the switch spring.

3. A control booster according to claim 2, wherein the switch operating rod extends through the valve body and wherein the switch operating rod movement restricting mechanism is formed in the switch operating rod and comprises a large-diameter portion having a large diameter as compared to a through-hole in the valve body.

4. A control booster according to claim 1, wherein the switch is provided in the constant pressure chamber.

5. A control booster comprising:
a power piston dividing an inside of a housing into a constant pressure chamber and a variable pressure chamber;
a valve mechanism which controls supply of a working fluid to the variable pressure chamber in accordance with movement of a plunger connected to an input rod associated with a brake pedal, the valve mechanism being provided in a valve body supported by the power piston;
an electromagnetic bias means having a movable element which operates the valve mechanism independently of operation of the input rod, the control booster being adapted to generate a thrust in the power piston due to a differential pressure generated between the variable pressure chamber and the constant pressure chamber based on operation of the valve mechanism;
a switch for detecting relative movement of the input rod relative to the valve body;
a switch operating rod for operating the switch; and
a switch spring for biasing the switch operating rod in a direction for pushing-in a contact operating element of the switch,
wherein in a brake pedal non-operated state in an automatic brake mode, the switch operating rod is pressed by the valve body through a pivot lever pivotably supported on the plunger and is separated from the switch and wherein when the input rod is operated in a direction for increasing an output of the booster in the brake pedal non-operated state in the automatic brake mode, the switch operating rod is freed from a pressure of the valve body applied through the pivot lever and abuts against the switch.

6. A control booster according to claim 5, wherein the pivot lever is pivotably supported on a stop key which is integrally attached to the plunger.

7. A control booster according to claim 5, wherein the switch is provided in the constant pressure chamber.

8. A control booster comprising:
a power piston dividing an inside of a housing into a constant pressure chamber and a variable pressure chamber;
a valve mechanism which controls supply of a working fluid to the variable pressure chamber in accordance with movement of a plunger connected to an input rod associated with a brake pedal, the valve mechanism being provided in a valve body supported by the power piston;

an electromagnetic bias means having a movable element which operates the valve mechanism independently of operation of the input rod, the control booster being adapted to generate a thrust in the power piston due to a differential pressure generated between the variable pressure chamber and the constant pressure chamber based on operation of the valve mechanism;

a switch for detecting relative movement of the input rod relative to the valve body;

a switch operating rod for operating the switch;

a switch spring for biasing the switch operating rod in a direction for pushing-in a contact operating element of the switch; and an operating member for pressing the switch operating rod against an action of the switch spring and moving the switch operating rod in a direction for separation relative to the switch.

9. A control booster according to claim 8, wherein the operating member comprises a stop key provided at the plunger and wherein when the input rod is operated in a direction for increasing an output of the booster, the stop key presses the switch operating rod against the action of the switch spring and moves the switch operating rod in the direction for separation relative to the switch.

10. A control booster according to claim 8, wherein the switch is provided in the constant pressure chamber.

11. A control booster according to claim 8, wherein when the input rod is operated in the direction for increasing the output of the booster, the operating member releases a pressure applied to the switch operating rod and the switch spring pushes-in the contact operating element of the switch due to a biasing force of the spring.

12. A control booster according to claim 11, wherein when the input rod is operated in a direction for decreasing the output of the booster, the operating member presses the switch operating rod against the action of the switch spring and moves the switch operating rod in the direction for separation relative to the switch.

13. A control booster according to claim 12, wherein the operating member comprises a stop key having one end thereof attached to the plunger and a pivot lever pivotably supported on the stop key through a supporting shaft.

14. A control booster according to claim 13, wherein the supporting shaft is provided at a position in the stop key on a side closer to the plunger.

15. A control booster according to claim 14, wherein the pivot lever extends to at least a position facing one end of the switch operating rod in a direction away from the plunger relative to the supporting shaft.

16. A control booster according to claim 15, wherein the pivot lever includes a first arcuate portion formed in the vicinity of the supporting shaft, the first arcuate portion protruding toward a rear-side abutment surface of the valve body.

17. A control booster according to claim 16, wherein a second arcuate portion protruding on a side of a front-side abutment surface of the valve body is formed in the pivot lever at a position between a distal end portion thereof and the first arcuate portion.

* * * * *